Figure 2:
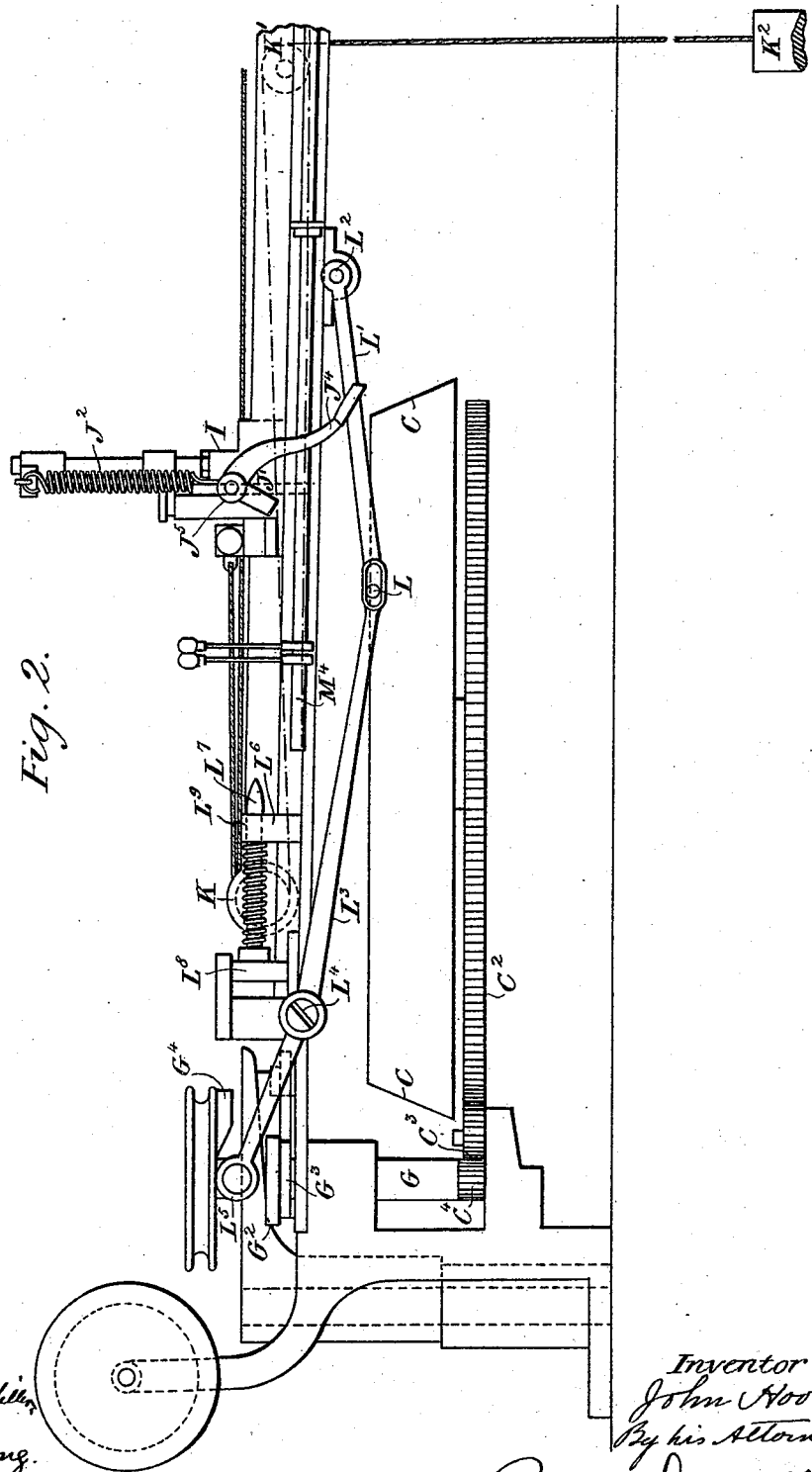

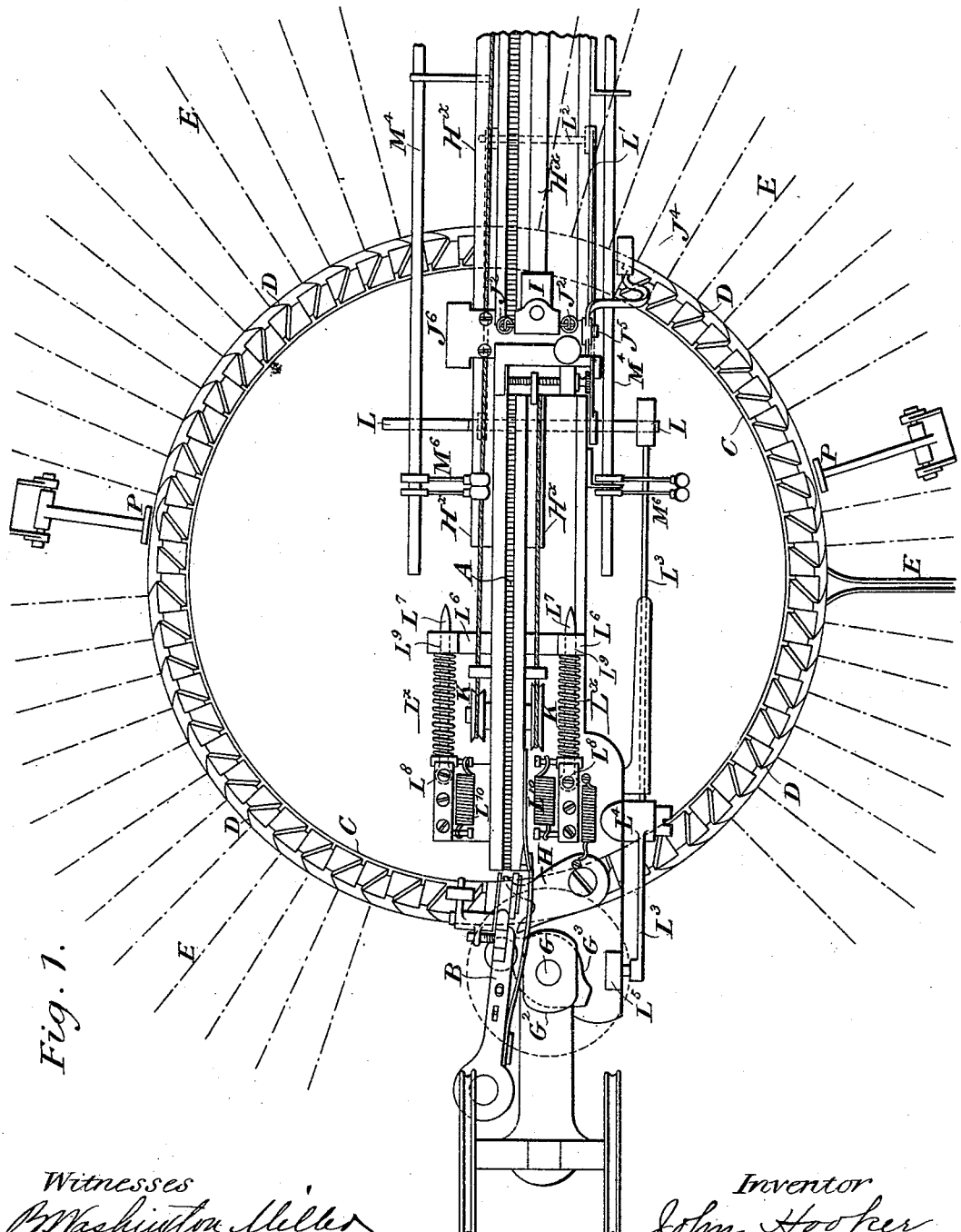

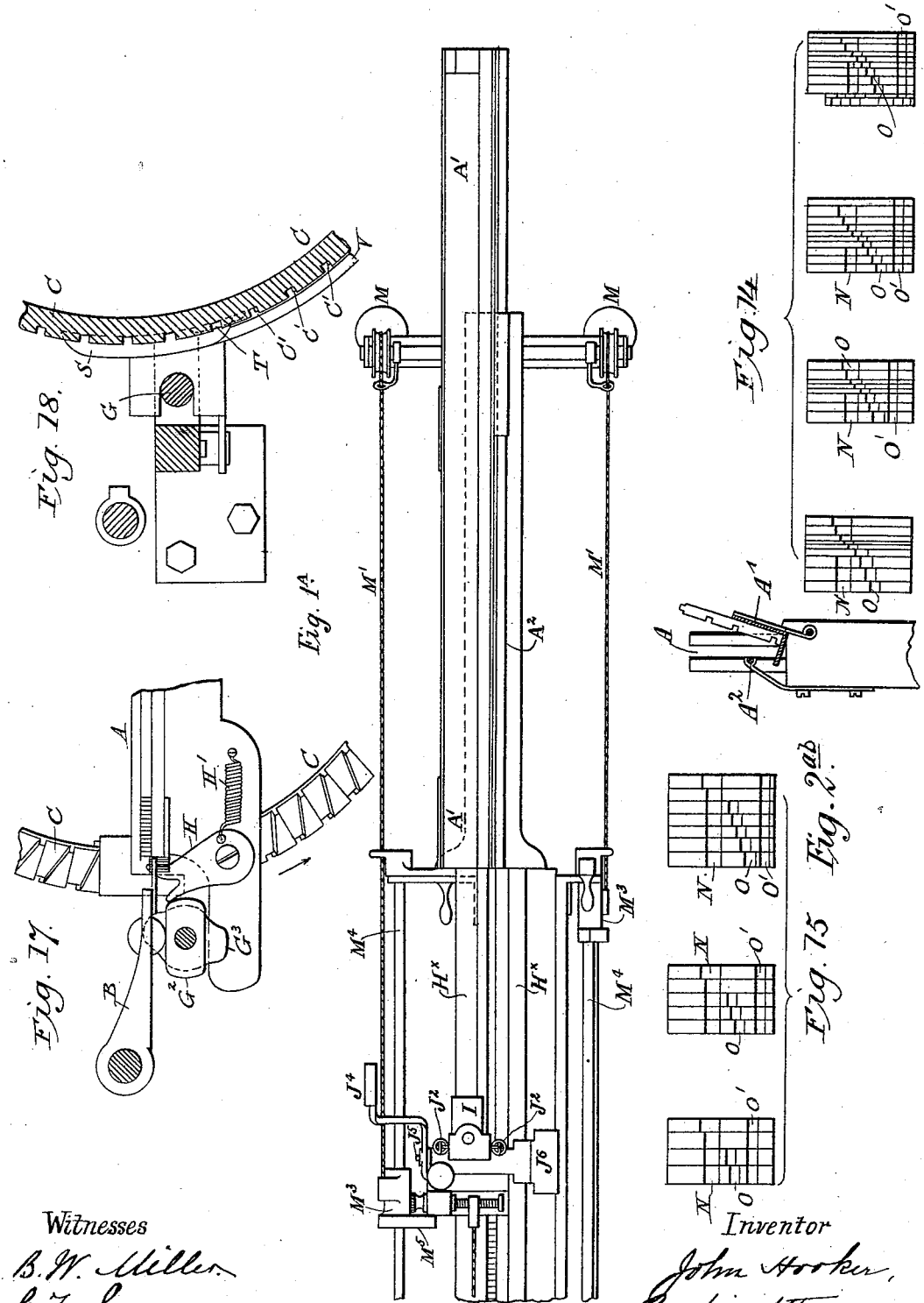

(No Model.)

13 Sheets—Sheet 3.

J. HOOKER.
MACHINERY FOR DISTRIBUTING TYPE.

No. 493,270. Patented Mar. 14, 1893.

Witnesses
P. Washington Miller
Baltus De Long.

Inventor
John Hooker,
By his Attorneys,
Baldwin, Davidson & Wight.

THE NORRIS PETERS CO., PHOTO-LITHO., WASHINGTON, D. C.

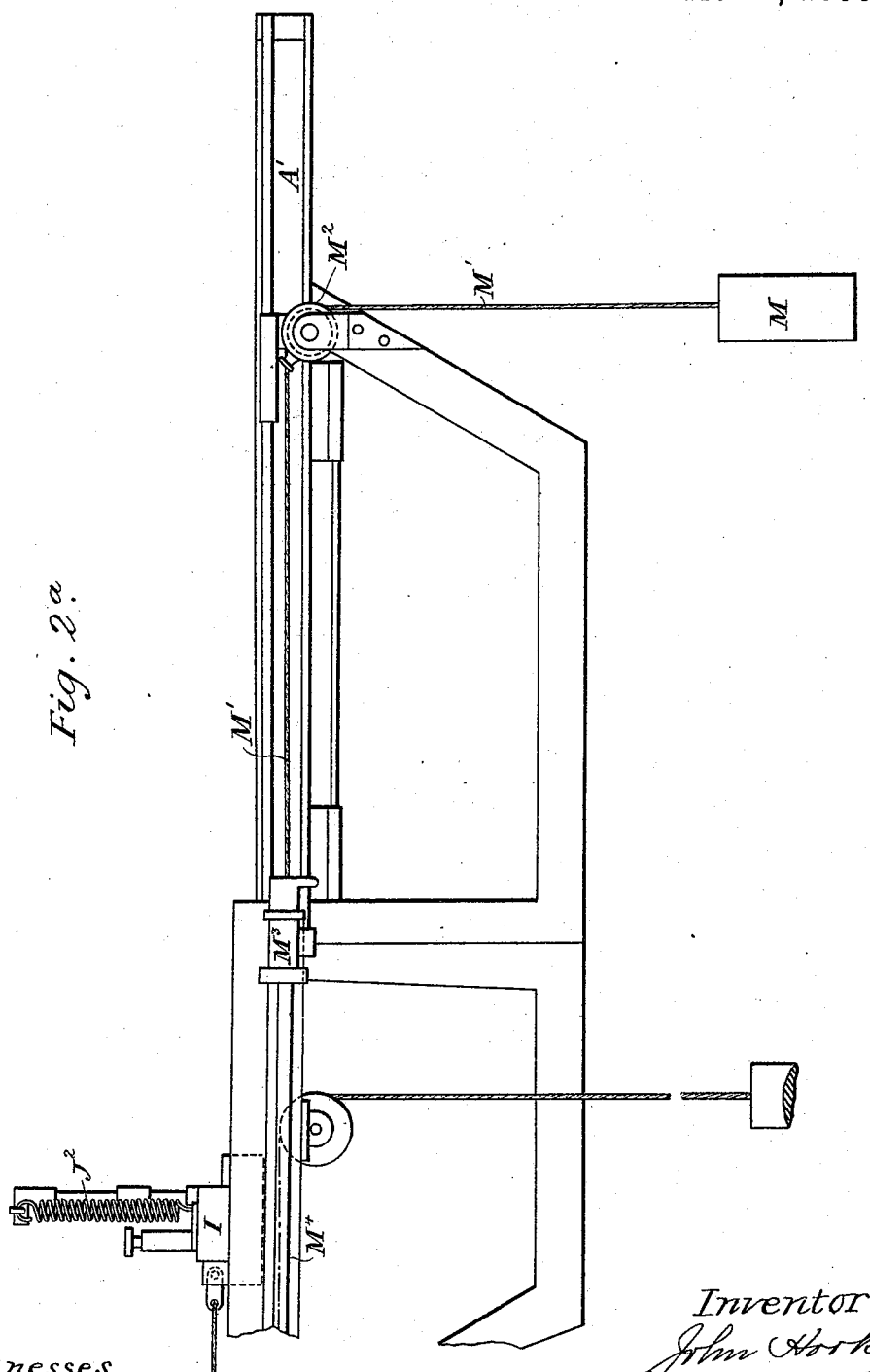

(No Model.) 13 Sheets—Sheet 5.
J. HOOKER.
MACHINERY FOR DISTRIBUTING TYPE.
No. 493,270. Patented Mar. 14, 1893.
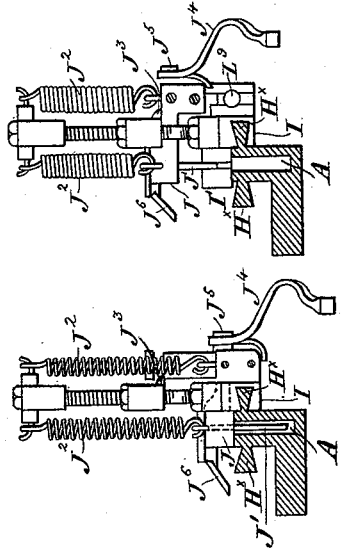
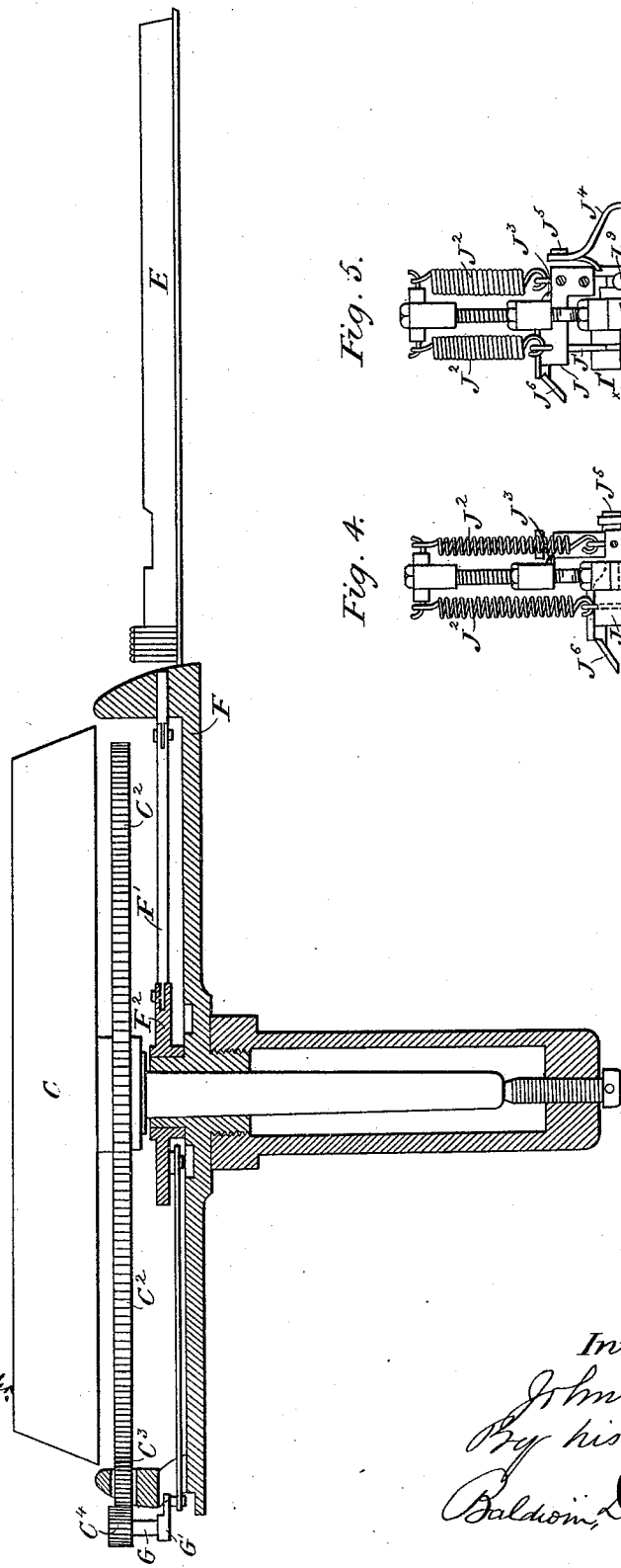
Witnesses
B. Washington Miller
Baltus DeLong
Inventor
John Hooker,
By his Attorneys.
Baldwin, Davidson & Wight (No Model.) 13 Sheets—Sheet 6.
J. HOOKER.
MACHINERY FOR DISTRIBUTING TYPE.
No. 493,270. Patented Mar. 14, 1893.
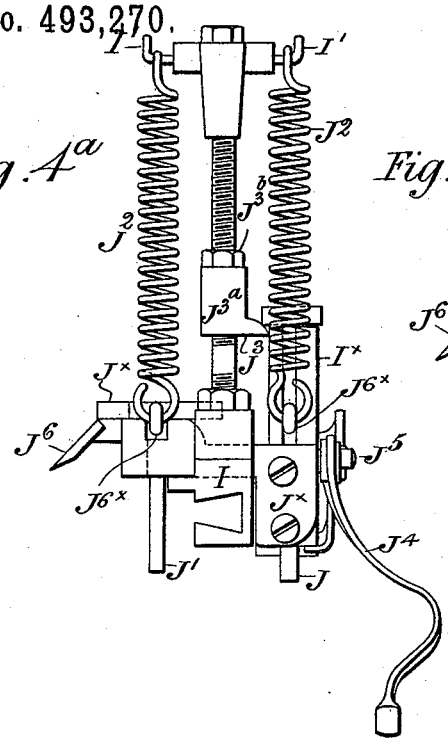
Fig. 4ª
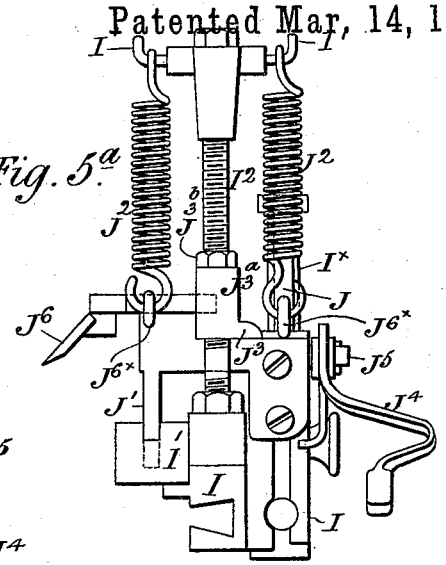
Fig. 5ª
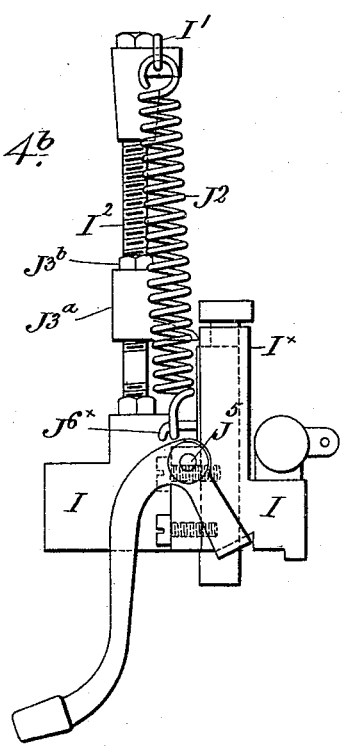
Fig. 4ᵇ
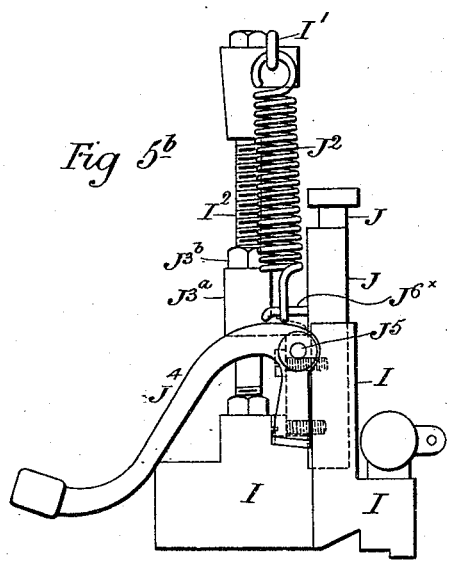
Fig. 5ᵇ
Witnesses
B. W. Miller
C. M. Brooke
Inventor
John Hooker,
By his Attorneys
Baldwin, Davidson & Wight (No Model.)
J. HOOKER.
MACHINERY FOR DISTRIBUTING TYPE.
No. 493,270. Patented Mar. 14, 1893.
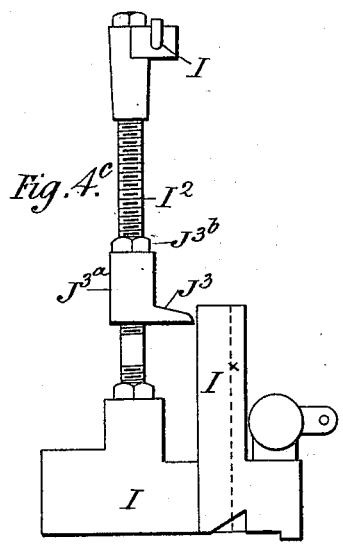
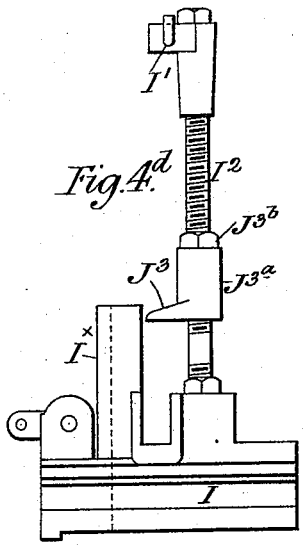
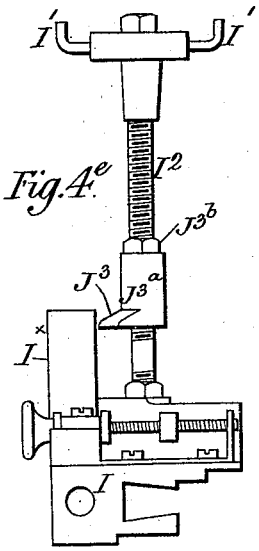
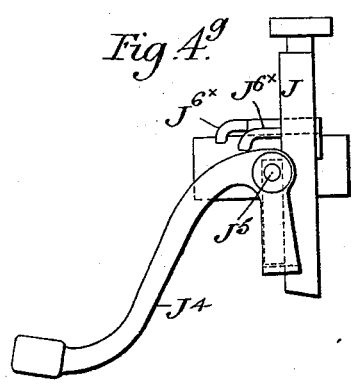
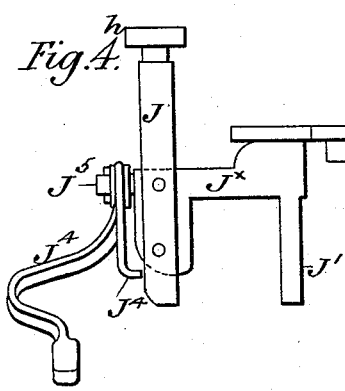
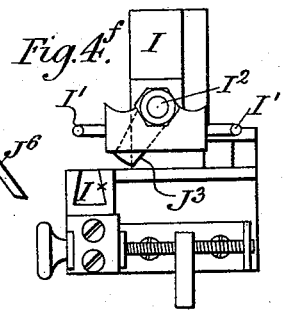
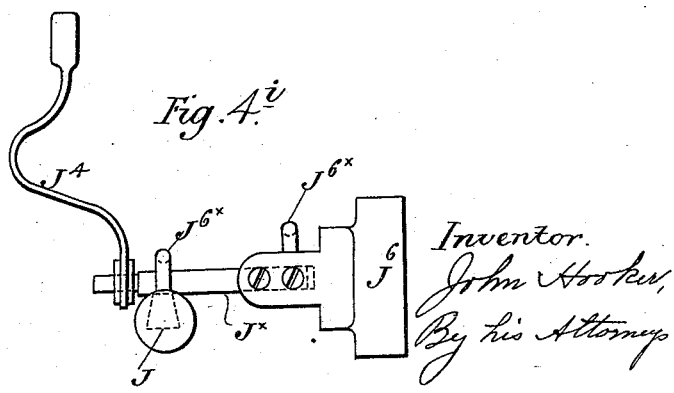

(No Model.)
13 Sheets—Sheet 8.
J. HOOKER.
MACHINERY FOR DISTRIBUTING TYPE.
No. 493,270. Patented Mar. 14, 1893.
Fig. 6.
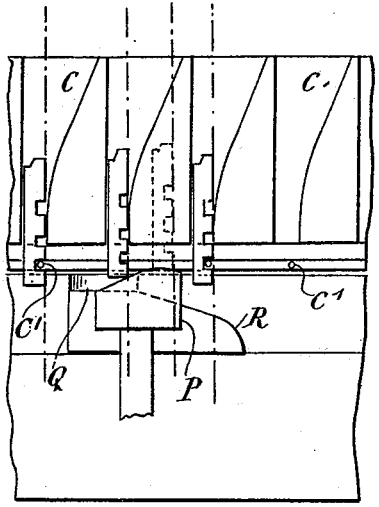
Fig. 7. 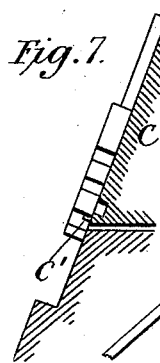 Fig. 8. 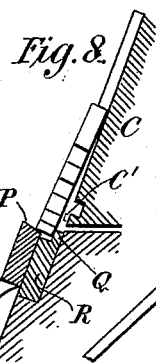 Fig. 9. 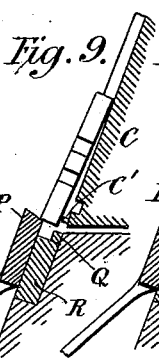 Fig. 9.ˣ 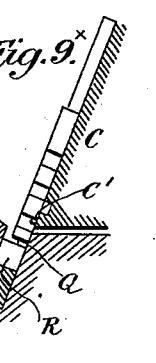
Fig. 6.ˣ
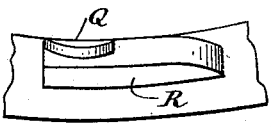
Fig. 10.
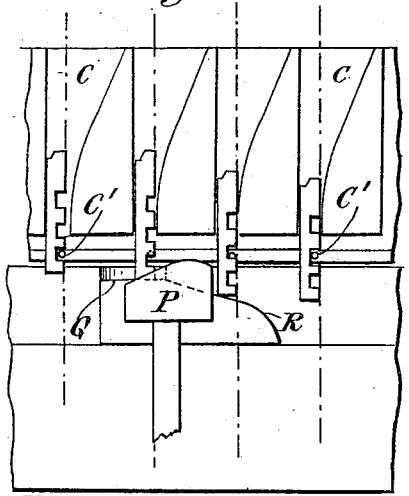
Fig. 11.  Fig. 12. 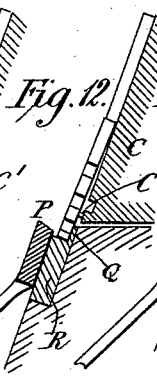 Fig. 13. 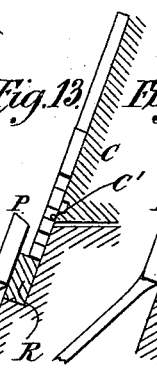 Fig. 13.ˣ 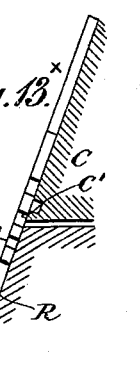
Witnesses.
B. W. Miller.
C. W. Brooke.
Inventor.
John Hooker,
By his Attorneys
Baldwin, Davidson & Wight.

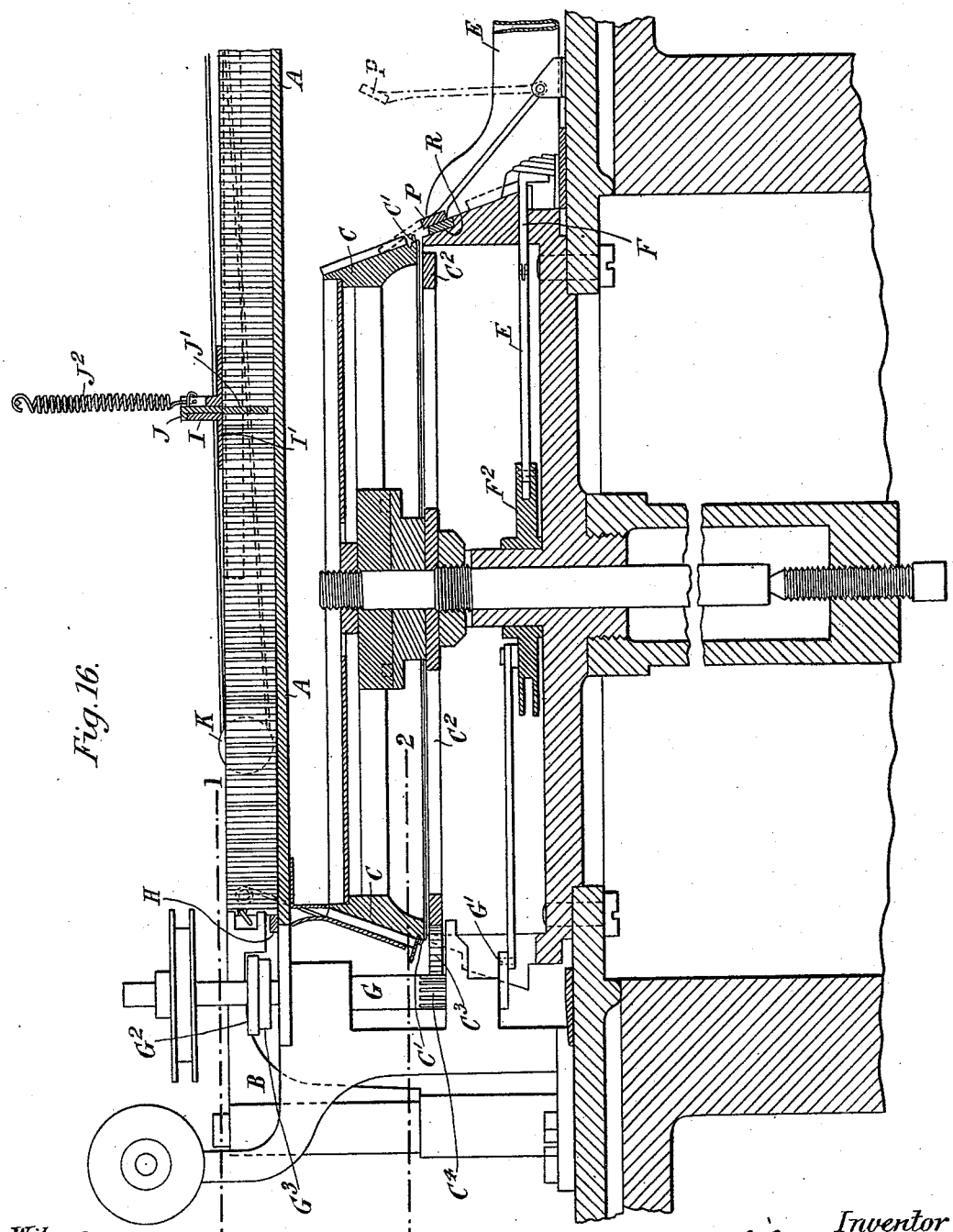

(No Model.) 13 Sheets—Sheet 10.
J. HOOKER.
MACHINERY FOR DISTRIBUTING TYPE.
No. 493,270. Patented Mar. 14, 1893.
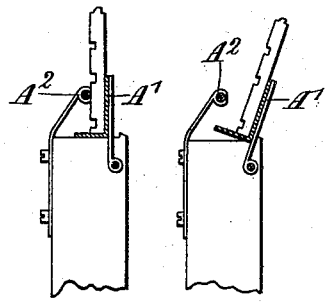
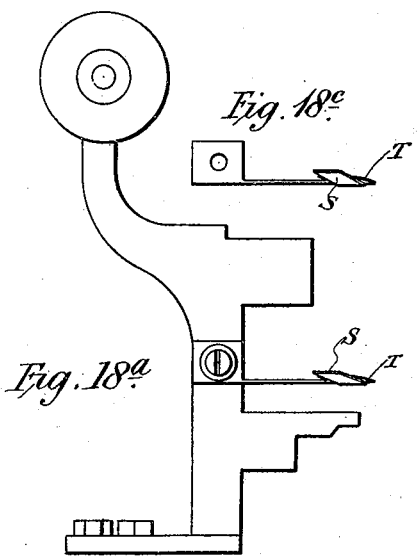
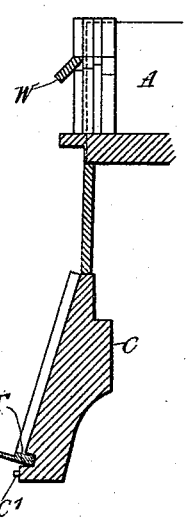
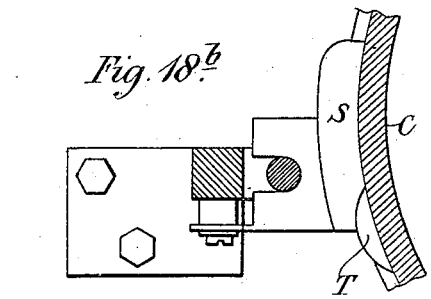
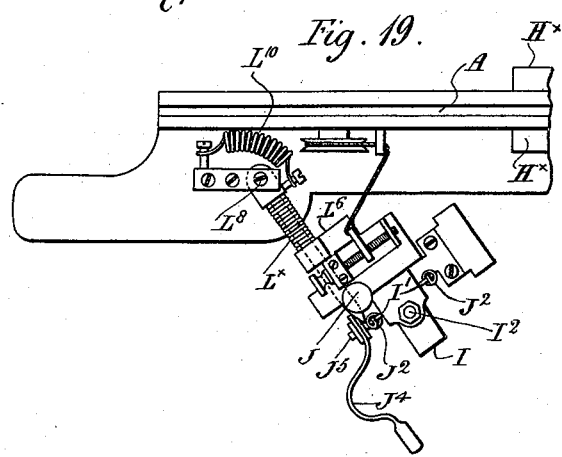
Witnesses.
B. H. Miller.
C. W. Brooke.
Inventor,
John Hooker,
By his Attorneys,
Baldwin, Davidson & Wight.

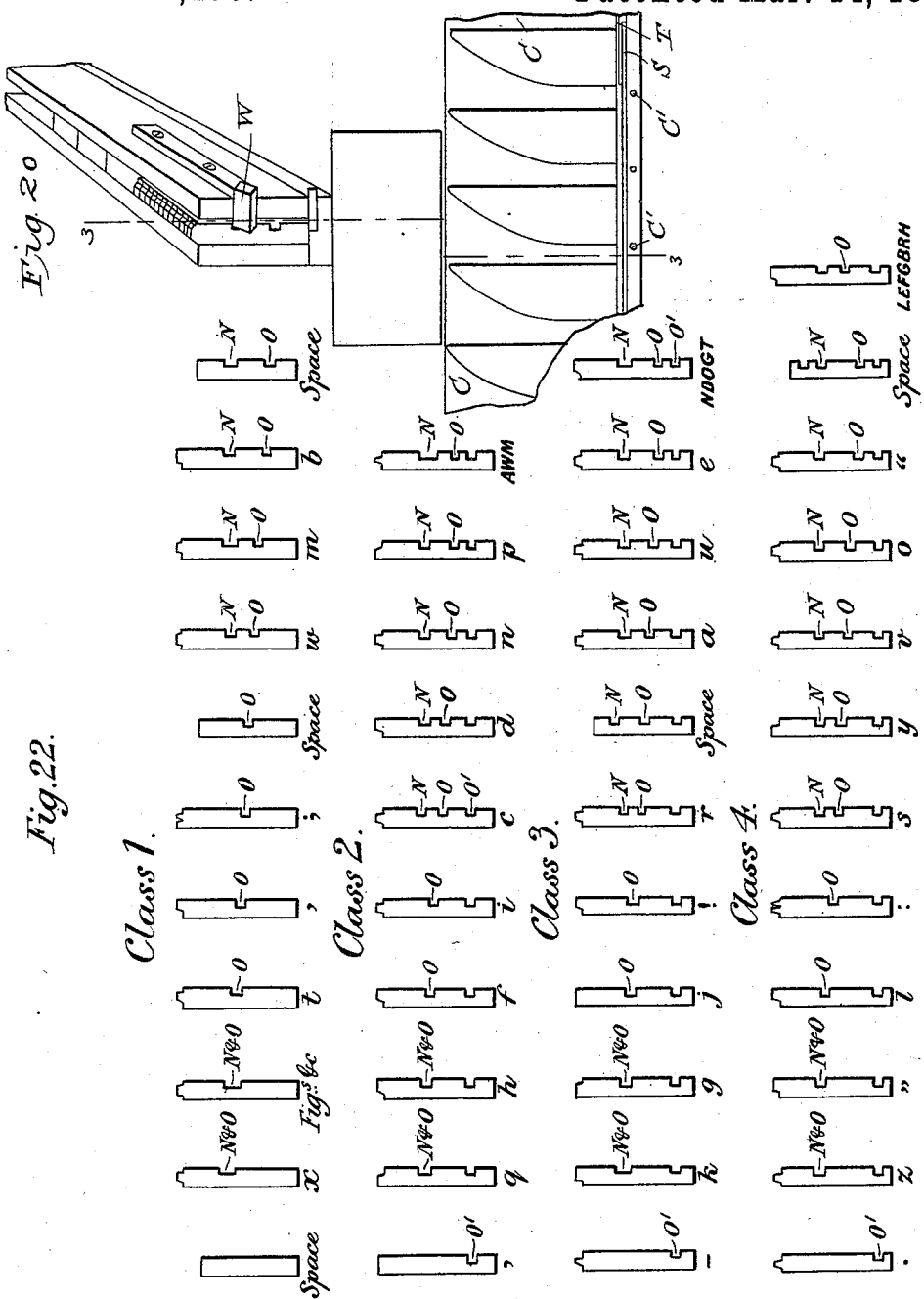

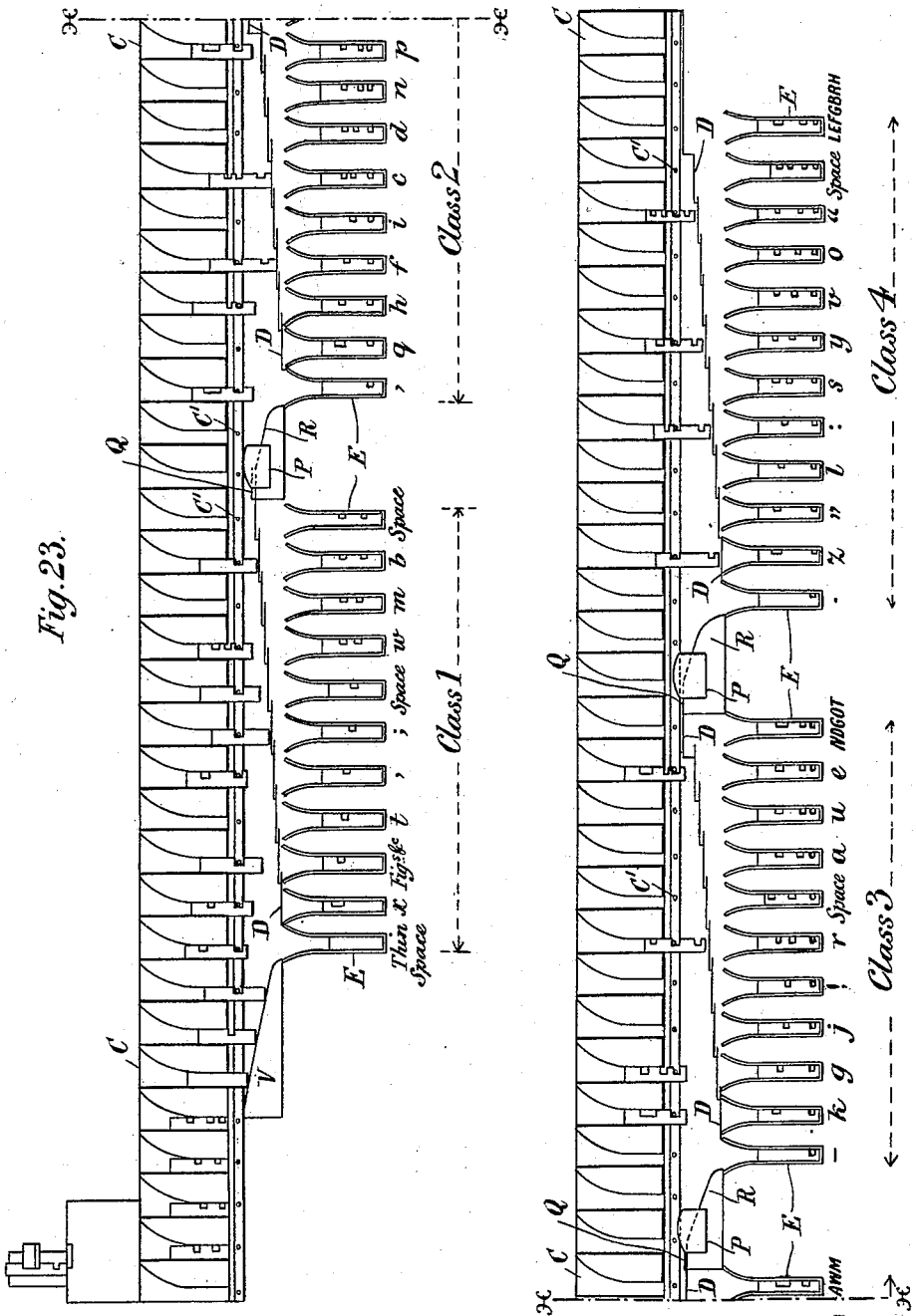

(No Model.) 13 Sheets—Sheet 13.
J. HOOKER.
MACHINERY FOR DISTRIBUTING TYPE.
No. 493,270. Patented Mar. 14, 1893.

UNITED STATES PATENT OFFICE.

JOHN HOOKER, OF BECCLES, ENGLAND.

MACHINERY FOR DISTRIBUTING TYPE.

SPECIFICATION forming part of Letters Patent No. 493,270, dated March 14, 1893.

Application filed November 23, 1891. Serial No. 412,815. (No model.)

*To all whom it may concern:*

Be it known that I, JOHN HOOKER, printer, a subject of the Queen of Great Britain, residing at Lancaster Place, Station Road, Beccles, in the county of Suffolk, England, have invented certain new and useful Improvements in Machinery for Distributing Type, of which the following is a specification.

My improvements relate to distributing machines such as are described in the specification of a British patent to William Hazlett Mitchell No. 155 in the year 1857. These machines are so constructed that the distribution is controlled by nicks cut in the edges of the type. A line of type is fed forward along a channel and the type are detached singly from the foremost end of the line, and are hung one by one on to pins which project out from the circumference of a horizontally revolving wheel—the nick nearest to the bottom of each type being the one by which it is first caused to hang on to the pin. As the type are carried round by the wheel they are carried past fixed stops set at different levels. If the lower end of any type comes against one of the stops, that type is detached from the wheel and drops into a receiving channel to be set up in line with others of the same sort. The type which hang down lowest first come against a stop and are disengaged—then the next lowest and so on—in this way some nine or ten may be distributed and until these have been cast off from the wheel, the remainder of the type are all kept at a higher level they having an additional nick cut in them close to their lower end—these additional nicks are called "class" nicks. The type which have class nicks cut in them are divided into three or more classes or divisions—and the class nicks of the three divisions are at three different distances from the bottom of the type. All those type which have the class nick cut in them at a greater distance from the bottom than the others now come against a stop which disengages them from the pin on which they were hanging, and they then drop until the next nick cut in them gets caught by the pin upon which they were previously hanging. In this way some nine or ten more type can be distributed each into separate channels. The next class are now lowered and nine or ten more distributed and so on. This is the way in which the distribution is governed in Mitchell's machine. In this way Mitchell's machine could be made to distribute about forty type which all differed one from the other.

The object of my invention is:—first, to make the machine capable of distributing a greater number of type which differ one from another; second, to make the machine continuous in its action and render it unnecessary to stop the machine each time that a new line of type is fed into the machine to be distributed.

To increase the number of type which the machine can distribute in place of each type differing from all the other type in the number or position of the nicks cut in it I form more than one type in each class with identically the same nicks, one of these type being a thin one, and the other a thick one and the machine I form in such a way that at the points where the type of that class hanging by their class nicks are to be disengaged and lowered all the type in the class shall be disengaged from the pins on which they were hanging, and the thin ones in the class allowed to drop until the pin enters the next nick cut in each while the thick ones are prevented from dropping and are put back on to the pins in the same position in which they were previously. Afterward when all the thin type of the class have been dropped into their respective receiving channels the thick types of the class are all lowered and then distributed into the channels which are to receive them. Afterward the next class or division of the type are treated in the same way, and so on.

To make the feeding of a line of type into the machine continuous I feed forward the line of type by means of two drivers, which are made to come into action one after the other as hereinafter described.

Figure 24:
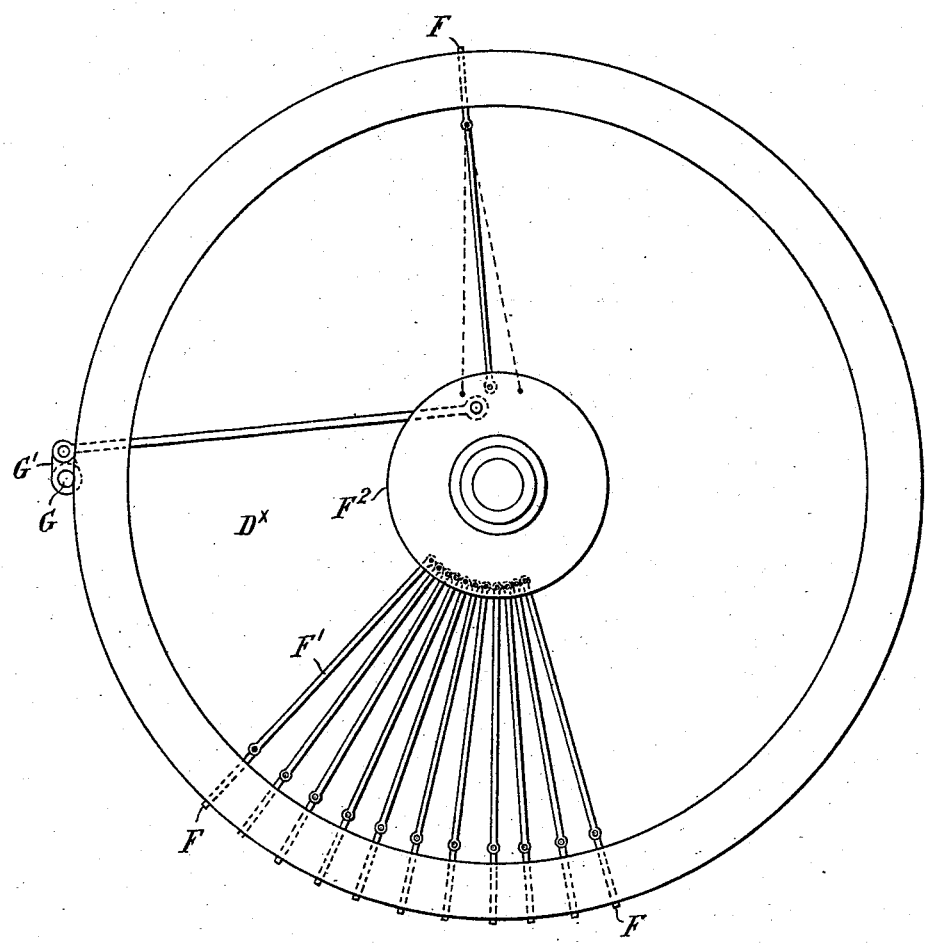

Figures 1 and 1$^A$ show a plan view and Figs. 2 and 2$^a$ a side elevation of the greater part of a distributing machine such as is described in the specification of the above mentioned patent having my improvements applied to it. Figs. 2$^{aa}$ and 2$^{bb}$ are sections of the channel A'. Fig. 2$^{ab}$ is a view showing the end of the type channel A in different positions. Fig. 3 is a vertical section of a portion of the machine showing how the distributed type are set up in line in the receiving channels. Figs. 4 and 5 are vertical sections of one of the slides by which the line of type in the feeding channel is fed forward continuously. Fig. 4$^a$ is a similar view to Fig. 4, on a larger scale, but with the slide down. Fig. 5$^a$ is similar to Fig. 4$^a$ but with the slide up. Fig. 4$^b$ is a side elevation of Fig. 4$^a$. Fig. 5$^b$ is a side elevation of Fig. 5$^a$. Figs. 4$^c$, 4$^d$, 4$^e$ and 4$^f$ are separate views of the block I. Figs. 4$^g$, 4$^h$ and 4$^i$ are separate views of the slide J and parts connected therewith. Fig. 6 is a face view of a portion of the revolving wheel and one of the bridge pieces past which the wheel travels. Fig. 6$^x$ is a plan of one of the inclines Q, and supporting ledge R separately. Figs. 7, 8 and 9 and 9$^x$ are vertical cross sections through the wheel in different positions showing how the thick type are supported by the bridge piece. Fig. 10 is a similar face view and Figs. 11, 12 and 13 and 13$^x$ are similar vertical sections showing how the thin type drop on to an inclined supporting ledge which lowers them until they are supported by the next nick which they have formed in them. Fig. 14 shows side views of four sets of types which the machine can be made to separate without the use of any bridge pieces. Fig. 15 shows a set of type nicked in the manner above described some thick types having identically the same class nicks as other thin ones. Fig. 16 is a longitudinal section of the main portion of the machine; Fig. 17, a section on the line 1—1 Fig. 16; Fig. 18, a section on the line 2—2 Fig. 16. Figs. 18$^a$ and 18$^b$ show how the horizontal plate is carried and held in place, and Fig. 18$^c$ shows a view of the horizontal plate S separately. Fig. 19, a plan of part of the machine, showing how the slide blocks I can be removed from the ends of their dovetail guides H$^x$; Fig. 20, a perspective view showing the end of the type-channel A, and a portion of the circumference of the wheel C; Fig. 21, a vertical section on the line 3—3 Fig. 20. Fig. 22 shows side views of the several type in the several classes. In these figures the letters below each type show the letters that the type print. Where several letters are below a single type it indicates that there are several type with the same nicks, and that these type have to be sorted one from the other, at a subsequent operation. Fig. 23 shows the circumference of the wheel C spread out into a straight line, with the channels E in which the type are to be collected shown in section below it. Fig. 24 is a plan view of the fixed conical bed D$^x$, which is below the wheel C; this figure shows the way in which a to and fro motion is given to the pushers which propel the type along the channels E, one after the other, as they drop from the wheel into the channels.

A, see Figs. 1 and 2, is the channel along which the line of type which is to be distributed is fed continuously.

B is the vibrating finger for conveying away the type sidewise one by one from the end of the channel.

C is a conical wheel revolving above a conical bed. The wheel is formed with grooves down its inclined or conical face each of a size for a type to be able to lie in it.

C' (see Figs. 6 to 13) is a small pin at the bottom of each groove to enter a notch in the side of any type delivered into that groove and hold the type suspended.

D are inclines in steps, one slightly at a higher level than the preceding one for the lower end of the type to strike against.

E are radial channels for receiving the type as they are detached from the revolving wheel by the action of the stepped inclines D, one such channel being situated below each inclined step.

F are radial pushers which act against the type as they are dropped into the receiving channels and move the types forward in these channels. The several pushers are as shown at Fig. 3 coupled by links F' to a ring F$^2$ to which an oscillating to and fro motion around the axis of the wheel C is imparted from a crank G' on the lower end of a vertical cam shaft G, and in this way the pushers are moved to and fro. The revolving wheel C is driven by a toothed wheel C$^2$ gearing with an intermediate pinion C$^3$ which is in gear with a pinion C$^4$ on the vertical cam shaft G to which a continuous revolving motion is imparted. On this shaft G is a cam G$^2$ for giving a to and fro motion to the vibrating finger B and another cam G$^3$ for giving a to and fro motion to a lever H which serves as a stop for the forward end of the column of type to bear against at a time when the foremost type has been carried away sidewise by the vibrating finger and which when the vibrating finger has returned to its original position allows the column of type to move forward slowly to bring the next type into position for the vibrator to carry it away.

The action of machines so constructed is as follows:—The type in the channel A are constantly pressed forward along the channel—the bottom of the channel is continued somewhat beyond the sides so that the foremost type is still supported, even when it passed beyond the ends of the sides. One type only at a time is allowed to pass beyond the end of the sides of the channel; as, however, some type are thick and others thin special provision has to be made for controlling the distance that the line of type in the channel A, is moved forward each time that a type has been knocked away from its foremost end. If a thin type is foremost in the channel, then the type must be moved forward a short distance only, whereas, if the foremost type is a thick one, it must be moved forward a greater distance.

The controlling of the distance that the type can move forward is effected as follows:—In front of the end of the channel A is a fixed inclined stop W. In the type are nicks N, hereinafter called "thickness nicks." In the thinnest of the type no "thickness nicks" are required; some of the "thickness nicks" in the type are made of less depth than others; in the thickest type the nicks are made deepest; in the thinner type, they are of less depth. The inclined stop W, is set at the same level as the "thickness nicks" in the type. If the foremost type is a very thin one and has no "thickness nick" cut in it, then the side of this type comes against the end of the stop, and is arrested by it. If the type is a thicker one and has a "thickness nick" cut in it, then the end of the stop enters the "thickness nick" and the type is not arrested until the lower edge of the nick comes against the stop; thus the distance the type moves forward depends upon the depth of the "thickness nick." When the foremost type in the channel has been arrested by the stop W and has then moved beyond the sides of the channel, it is struck off from in front of the other type which remain in the channel, by the finger B, which is moved against it by the action of the revolving cam $G^2$. In order to insure that the type in the channel A, shall not now at once move forward toward the stop W, and so prevent the return of the finger B, to its normal position, the lever H is provided; this is always kept bearing against the foremost type in the channel A, by a spring H'; the spring is not of sufficient strength to prevent the type from moving forward, but immediately after a type has been struck away from the end of the channel A, a cam $G^3$, comes against the back of the lever H, and prevents it from being turned by the pressure of type against it. The type in the channel A, therefore, remain at rest until the finger B has returned to its normal position; then, as the cam continues to revolve, it moves away gradually from the lever H, and allows the type in the channel A to come slowly forward until again arrested by the foremost type coming against the stop W. As each type is struck away from the end of the channel A, it drops into one of the grooves or channels in the inclined side of the wheel C, and it descends until it comes down on to a horizontal plate S. The wheel C is revolved at such a speed that, when a type is knocked away from the end of the line of type in the channel A, there is always an empty groove in the wheel C, ready for this type to fall into. The horizontal plate S, is just above the level of the short pins C', so that the type, as they fall on to the wheel C, do not strike against these pins. As the wheel C continues to revolve the type which are within the grooves are carried round along with it, their lower ends still resting on the horizontal plate S. After being carried round a short distance their lower ends come against a fixed incline T, which presses their lower ends outward away from the wheel, and keeps them so held away from the wheel until they have been carried beyond the end of the horizontal plate S; the type then drops a distance and comes down onto a fixed incline V; the bottom edge of the type will then be slightly below the level of the pin C', and the type will rest upon the end of the pin. As the type continues to be carried along by the revolving of the wheel, it descends slowly along the incline V, until the lowest or "class nick" O', in the type, drops over the pin and the type then remains suspended on this pin. As the type still continues to be carried along by the revolving wheel, the lower end of those in class 1 come against one or other of a number of fixed inclines D (see Fig. 1) which are at different levels, being formed in steps as shown in Fig. 23. When the lower end of any type comes against any one or other of these inclines it is by it thrust outward away from the wheel until the type is no longer upheld by the pin C'; the type then drops into the receiving channel E, that is below it. In this way all the type of class 1 are delivered into the respective channels which are to receive them; but the type of all the other classes still remain hanging upon pins C', and are still carried round with the wheel because at present their lower ends are not at a level low enough for them to come against any of the inclines D. When, however, they have been carried past all the inclines D, belonging to class 1, and before they are carried past the inclines D, which belong to class 2, the type which belong to class 2, come against an incline Q, which moves their lower ends outward away from the wheel C, and disengages them from the pins C'; they then drop onto an incline R and descend this incline until the next notch O, in the type drops on to the pin C'; the type is then suspended at a lower level than previously and is carried past the set of inclines D, that belong to class 2, and is by one or other of them detached from the wheel and allowed to drop into a receiving channel E. The types which belong to class 3 now come against another incline Q, and are similarly lowered, so that they in turn may be brought against inclines D, and so on for the other classes. As the type drop from the wheel into the channels E, they are propelled forward along the channels by pushers F, to which a reciprocating to and fro motion is given continuously by their being connected by links to crank-pins on the circumference of a disk to which an oscillating revolving motion is given from a crank G', on the shaft G, as shown in Fig. 24.

In all the above respects the machine is constructed in a similar manner to that described in the specification of Mitchell's patent above mentioned.

I will now describe more fully my arrangement of mechanism for feeding forward continuously a line of type along the feeding-channel A. $H^\times H^\times$ are dovetail guides formed along the two opposite sides of the feeding channel A. I I are blocks capable of being slid along these guides. J is a slide capable of being slid up and down into a vertical guide $I^x$ which stands up from the block I. The slide is triangular in cross section, and the guide is correspondingly shaped to fit to it. The slide J has an arm $J^x$ secured to it. This arm carries a blade J' which descends into the channel A when the slide is in its lowest position and is raised above the channel when the slide is in its highest position. $J^2$ are springs for drawing the slide upward. At one end they are hooked on to hooks $J^{6x}$ which project from the arm $J^x$, and at the opposite end are hooked on to hooks I', at the top of a standard $I^2$ which rises up from the block I. $J^3$ is an adjustable stop which limits the extent to which the slide can be drawn upward by the springs. This stop is an arm which stands out horizontally from a nut $J^{3a}$, which screws on to a screw thread cut around the standard $I^2$. $J^{3b}$ is a lock nut for locking the nut $J^{3a}$ when it has been adjusted in position. The arm $J^3$ projects over the top of the horizontal arm $J^x$ which is secured to the slide J, so that when the slide is drawn upward by the springs $J^2$, the arm $J^x$ strikes against the under side of the arm $J^3$, and is stopped by it. $J^4$ is a lever catch jointed to the slide at $J^5$. When in the position shown in Figs. 4, $4^a$ and $4^b$ the shorter arm catches under the block I and keeps the slide J from being drawn upward by the springs. When the longer arm is struck upward the shorter arm is disengaged from below the block I and the slide is at once drawn upward by the springs. I' is a projection from the block I which comes above the line of type in the channel A, the blade J' passes down through this projection and the projection serves to prevent the types which are in contact with the blade from rising with the blade at the time when the blade is drawn upward. Each block I is drawn forward by a cord which passes forward from it and around a pulley K then back and over a pulley K' and has a weight $K^2$ attached to its end.

I will now describe the way in which the blade J' is lifted up above the line of type in the channel A whenever the block I which carries it has arrived within a short distance from the foremost end of the channel. L is a rod carried by arms L' which project out from an axis $L^2$. One end of the rod enters a slot in the end of a lever $L^3$ which turns on a pin at $L^4$. The other end of the lever carries a truck $L^5$ which is acted upon by a cam $G^4$ on the cam shaft G. The cam is as shown formed in such a manner as to depress the truck $L^5$ once for each revolution of the cam shaft and it depresses the truck just when the vibrating finger has moved to one side carrying a single type along with it and the column of type in the channel A is therefore at rest. Each time that it is depressed it raises the rod L above the level of the lower end of the longer arm of the catch lever $J^4$. When the block I has traveled forward to such a position that the rod L or the end of the lever $L^3$ in rising strikes against the lower end of the catch lever it turns this lever until the slide J is no longer held down by it. Preferably I make the lower end of the catch lever inclined as shown at Fig. 2 so that it may require two or three upward movements of the rod L to release the catch. The slide is then drawn upward by the springs $J^2$ and the blade J' so withdrawn from among the type in the channel A. The block is then free and is drawn forward by the action of the weight $K^2$ until it comes against a stop $L^6$ secured to the end of a spring $L^x$, which arrests it just before the block is free from the end of the dovetail guide $H^x$ along which it slides. The stop $L^6$ has a hole through it through which a horizontal rod $L^7$ passes. This rod $L^7$ can be turned on a vertical axis $L^8$. When the block is drawn forward against the spring stop the end of the rod $L^7$ enters a hole $L^9$ in the block and keeps the block from being jerked out of place. Normally the horizontal rod $L^7$ is held in the position shown in Fig. 1 by the action of a spring $L^{10}$ keeping the stop $L^6$ against the side of the channel A. To free the block I from the end of the dovetail guide $H^x$ the attendant takes hold of the block and draws it forward thereby still farther forcing back the spring stop. When the block is free from the guide $H^x$ the attendant moves the block outward away from the channel A, the rod $L^7$ then turning on the axis $L^8$ allowing him to do so and he then draws the block from off the rod and carries it back to the opposite end of the channel A and again places it on the guide $H^x$ after that a line of type to be distributed has been pushed into this end of the channel A.

The mechanism for enabling a line of type to be fed into the channel A is shown in Figs. $1^a$ $2^a$ $2^{aa}$ and $2^{bb}$ and is the same as is described in the specification of the before mentioned patent. It consists of an open channel or slide A' which can be turned into an inclined position as shown in the cross section Fig. $2^{aa}$ and when in this position a line of type can readily be laid on to it. It can then be turned into a vertical position, as shown in cross section, Fig. $2^{bb}$ when in this position the type are prevented from falling by their coming against the rod $A^2$ and the attendant can readily with his finger slide them along the channel A' and make them enter the channel A. When this has been done the channel A' can be turned back into its inclined position.

In order that the pressure upon the type which are in rear of the foremost block may only be just sufficient to make them move forward along with the block and not materially increase the pressure which is upon the type in front of the foremost block—I for the most part balance the weight which is drawing forward the second block by a counterweight M. A cord M' passes from this weight over a guide pulley $M^2$ and is attached to a slide $M^3$ that can slide freely along a rod $M^4$ but cannot turn around it. Each time that one of the blocks I is placed on to the end of its guide H<sup>×</sup> the rod M<sup>4</sup> is turned into such a position that an arm M<sup>5</sup> extending from the slide M<sup>3</sup> is brought in front of the block I and the weight M which tends to draw back the slide M<sup>3</sup> along the rod M<sup>4</sup> tends to draw back the block I with it but is somewhat overpowered by the weight K<sup>2</sup> which tends to draw the block forward. So soon however as the foremost block I goes out of action it is necessary that the next block should be set free from the counterweight M which was retarding its movement and that the block should be drawn forward by the whole of the weight K<sup>2</sup>. To do this the rod M<sup>4</sup> is turned so as to move the arm M<sup>5</sup> from in front of the block I so that the block is no longer retarded by it and the slide M<sup>3</sup> is drawn back by the action of the weight M. In order to turn the rod M<sup>4</sup> in this way at the proper time the rod has a weighted arm M<sup>6</sup> extending from it which at the time when the foremost block is to go out of action is above an incline J<sup>6</sup> which stands out from the slide J so that when the slide J is liberated and is drawn upward by the springs J<sup>2</sup> as above explained the incline strikes against the arm M<sup>6</sup> and throws it over.

In Figs. 14 and 15 I have shown how I form some of the thicker types with the same class nicks as some of the thinner ones. The nicks N in the type are the thickness nicks which govern the distance to which they can be protruded beyond the foremost end of the channel A as described in the specification of Mitchell's patent above mentioned. The nicks O are what I call distributing nicks—and the nicks O' what I call class nicks. In class 1 the types have no class nicks O' and only distributing nicks O and all these are at a greater distance from the bottom of the type than the class nick O' of the type of the second class—the class nick O' of this class is somewhat higher than the class nick O' of the third class and the one in the third class higher than that in the fourth. It will be seen that in some cases the nicks N serve also as distributing nicks. All of the type in class 1 when they are made to hang by their first nicks upon the pins C' of the revolving wheel C will therefore all be at a lower level than the type of the other classes which are suspended by their class nicks and will all be at different levels and as the wheel revolves they can be brought against inclined stops D which again are at different levels and as the lower end of each type is brought into contact with one or other of the stops it is moved outward away from the wheel until the pin no longer supports it and the type drops into its proper receptacle E just as described and so the several type in this class are delivered each into their proper receptacle. In the machine shown in Figs. 1, 2 and 3 three bridge pieces P are used—one between the receptacles of classes 1 and 2, one between 2 and 3 and one between 3 and 4. Figs. 6 and 10 show full size the bridge piece which is between the receptacles of classes 3 and 4. The top of the first bridge piece is at such a level that the type of classes 3 and 4 as they hang upon the pins C' of the revolving wheel are carried past without coming in contact with it—and the second bridge at such a level that the type in class 4 do not come in contact with it. Each bridge piece is at such a distance from the wheel that a gap of sufficient width is left between them for the thin type of the class that the bridge acts upon to drop through while the thicker ones are supported by the bridge and not allowed to drop. Just before the type of class 2 arrive at the first bridge P their lower ends come against inclines Q which move them outward away from the wheel and disengage them from the pins C' the type then drop slightly on to a supporting ledge R. As the wheel continues to revolve the thinner type of the class are carried through the space between the bridge and the wheel and as the supporting ledge R is made to slope gradually downward they descend until the pins C' enter their distributing nicks and the types then hang suspended from the pins. The thicker type as they come against the bridge piece are slightly raised by it so as to bring their class nicks O' again to the level of or above the pins C' and when the type have been carried past the incline Q, they again drop onto and hang by these pins. In place of the type being allowed to drop slightly when disengaged from the pins C' and then raised again to replace them on to the pins—they may be raised by riding up an incline and then lowered. The thin type of class 2 are therefore distributed into their proper receiving channels and in the machine shown in the drawings the thicker type of this class are all detached from the wheel by a fixed incline D as they come to the last of the receiving channels of this series and all drop into this channel so that they may subsequently be distributed by again feeding them into the machine after that the bridge pieces P have been turned to one side to put them out of action. In larger machines however the distribution of the thicker type of this class might be proceeded with immediately after the thinner ones had been distributed and before arriving at the point at which the thinner type of the third class commence to be distributed. At the second bridge the type of the third class are acted upon just in the same way and at the third bridge the type of the fourth class.

What I claim is—

1. A type distributing machine comprising a horizontally revolving wheel, a series of pins projecting from the circumference thereof and on which nicked type are hung by their nicks, means for actuating the wheel to carry around the type, a series of channels, means for dropping the type into their own proper channels, bridge pieces set at the points where the several classes of type hanging by their class nicks on to the pins are to be disengaged from the pins, said bridge pieces being constructed and arranged to allow the thin type only to descend a distance but put the thick ones of the class back again on to the pins in the same position that they were in before, so as to admit of the machine being used for distributing type, some of the classes or divisions of which contain two or more sets of type which have identically the same nicks cut in them but which are of different thickness.

2. The combination of a horizontally revolving wheel, means for actuating it, pins projecting from the circumference of the wheel, mechanism for delivering the nicked type one by one on to each pin as it is brought around to such mechanism, means for causing the nick which is nearest to the bottom of the type to engage with the pin, inclined stops at different elevations against which those of the type which hang lowest and which constitute one class come and are set free from the pins while the type of the other class which hang at a higher level are carried on by the wheel, means for actuating the mechanism above referred to, an incline against which the lower end of the next class of type are brought, and which disengage them all from the pins on which they were hanging, a fixed bridge piece set at this point at a short distance from the circumference of the wheel which supports such of the type which are too thick to pass between it and the wheel, but allows the thinner ones to descend until the next nick cut in each is caught by the supporting pin, stops to disengage those that hang lowest, a stop to subsequently disengage the thick ones of the class and allow them to descend until caught by the next nicks cut in them, and stops to disengage these thick ones before those in the next class are lowered.

3. In mechanism for feeding forward a continuous line of type to be distributed in a distributing machine, the combination of a channel supporting the line of type, two blocks, guides parallel with the channels on which the blocks are supported, means for sliding the blocks along the guides, a blade descending from each block into the type channel, a spring for drawing such blade upward out of the channel, a catch for retaining the blade in its lowest position and retaining it in the channel, means for drawing each block forward, mechanism for liberating the above-mentioned catch when the block has traveled to within a short distance of the foremost end of the channel and so putting that sliding block out of action while the line of type continues to be moved forward by the other sliding block.

4. The combination of the channel, two blocks, guides on which they are supported parallel with the channel, means for sliding the blocks on the guides, the blade descending from each block into the channel, the spring for drawing it up, the catch lever for holding it down, the weighted cord for drawing each block forward, a lever, a cam, a continuously revolving shaft on which the cam is mounted, said cam being arranged to strike against the catch lever and set the blade free to be drawn up and put out of action when the block has traveled to within a short distance of the foremost end of the channel.

5. The combination of the channel, two blocks, guides parallel with the channel on which the blocks are mounted, means for sliding the blocks along the guides, a blade descending from each block into the channel, the spring for drawing it up, the catch for holding it down, the weighted cord for drawing each block forward, the weighted cord for drawing the block backward and partially balancing the action of the weight which is drawing it forward, the catch for locking this second cord to the block, and mechanism for liberating this catch and releasing the block from the cord at the time when the blade carried by a preceding block is drawn upward out from the channel and put out of action.

6. The combination of the channel, two blocks, guides in which the blocks are mounted, means for sliding the blocks along the guides, the blade descending from each block into the channel, the spring for drawing it up, the catch for holding it down, the weighted cord for drawing each block forward, the spring stop for the block to come against when the blade is drawn up from the channel, the hinged joint upon which said spring-stop is carried and which allows the block's being moved away sidewise and set free from its guides after it has been drawn up to the stop.

JOHN HOOKER.

Witnesses:
WILMER M. HARRIS,
JOSEPH LAKE,
*Both of 17 Gracechurch Street, London, E. C.*